June 7, 1955  N. A. PETERSON ET AL  2,709,930
SAW FILING TOOL
Filed Feb. 6, 1953  3 Sheets-Sheet 1
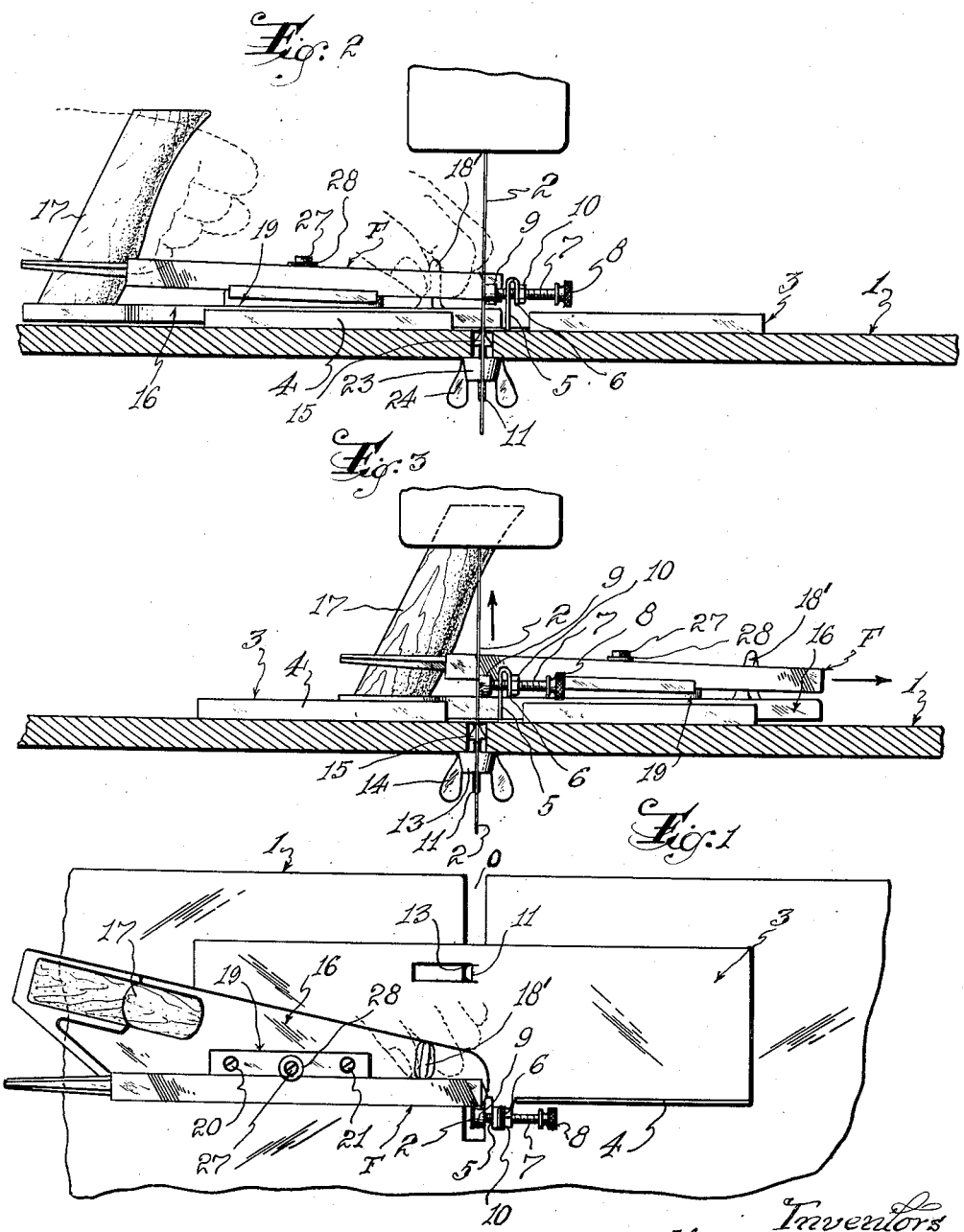
Inventors
Norman A. Peterson
David A. Peterson
BY
A. D. T. Libby
Attorney June 7, 1955
N. A. PETERSON ET AL
2,709,930
SAW FILING TOOL
Filed Feb. 6, 1953
3 Sheets-Sheet 2
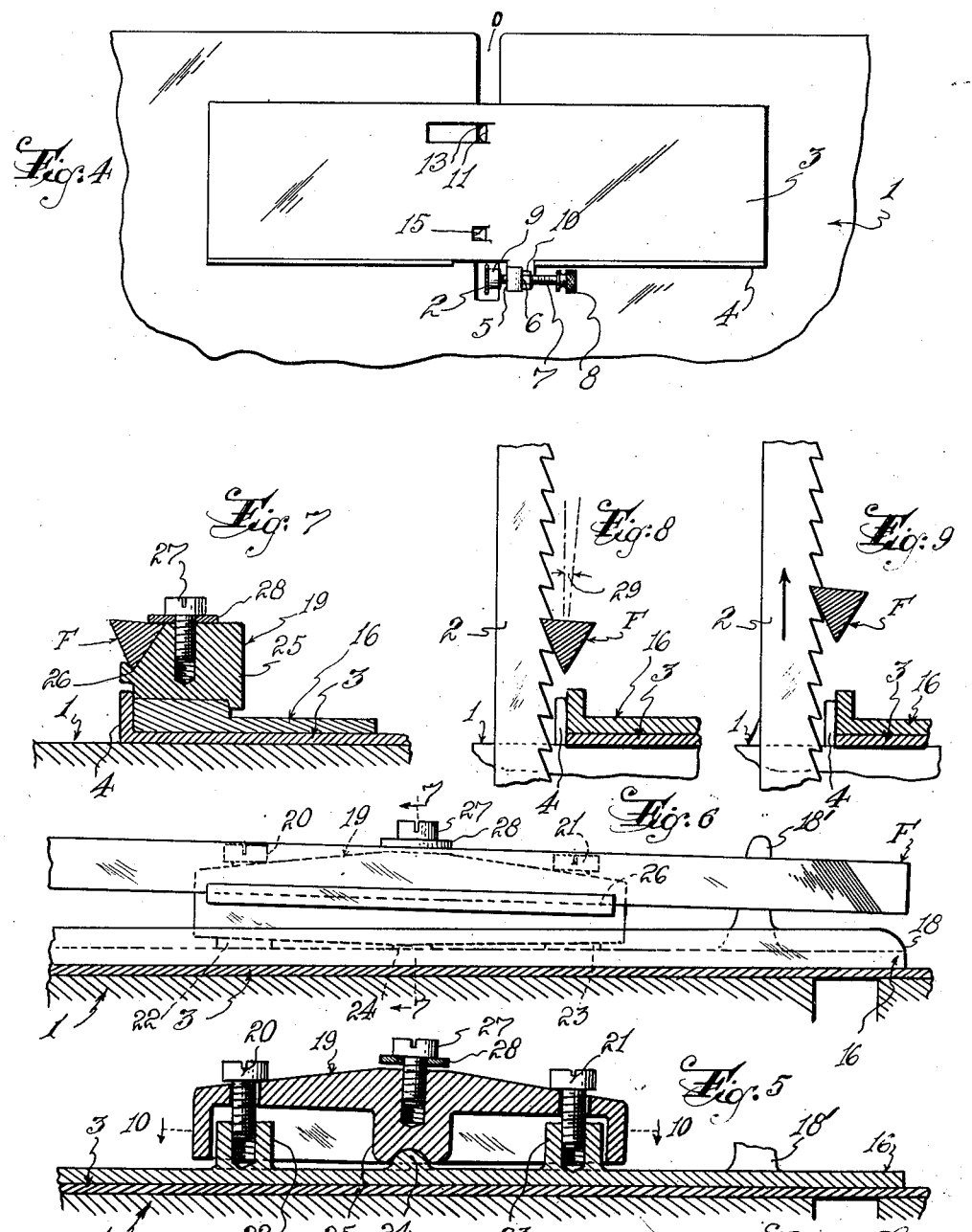
Inventors
Norman A. Peterson
David A. Peterson
BY
A. D. J. Libby
Attorney

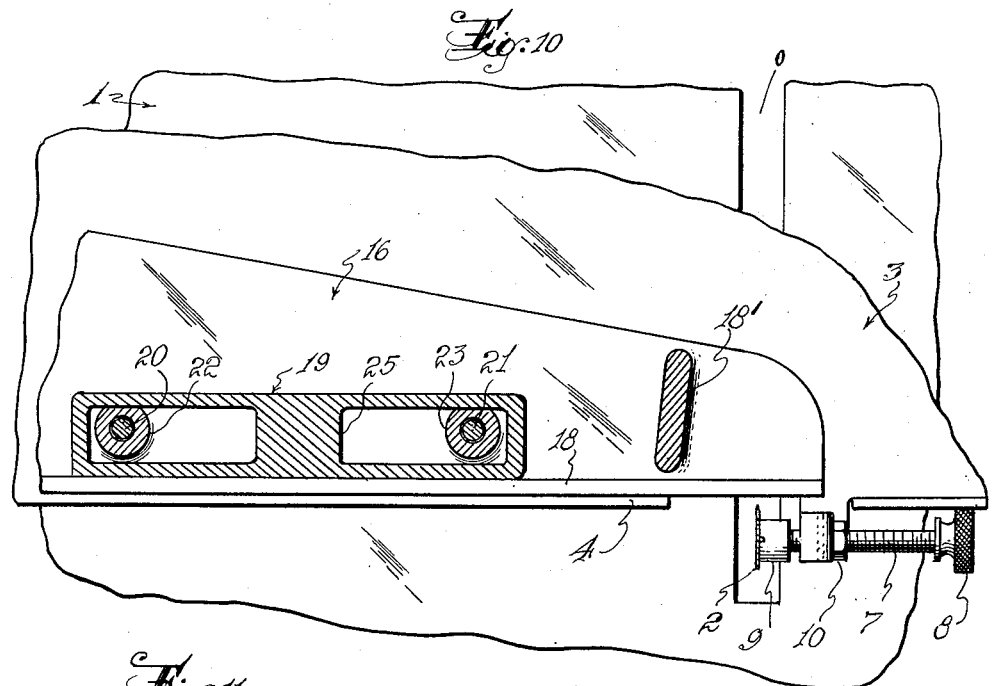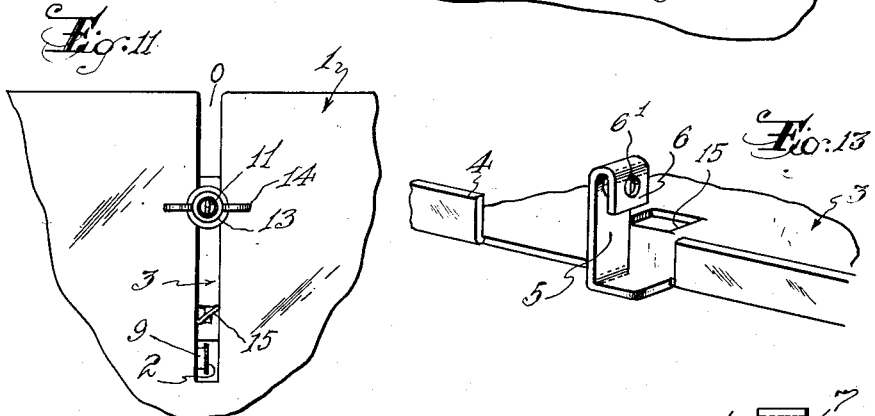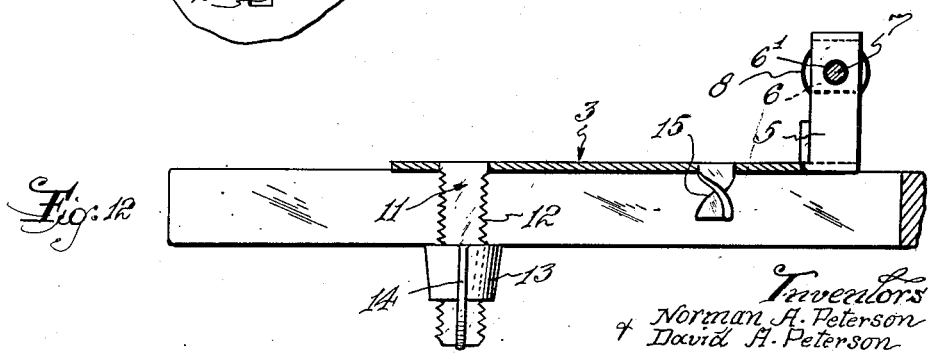

United States Patent Office 2,709,930
Patented June 7, 1955

2,709,930

SAW FILING TOOL

Norman A. Peterson, Millington, and David A. Peterson, Millburn, N. J.

Application February 6, 1953, Serial No. 335,412

10 Claims. (Cl. 76—35)

This invention relates to a new and improved means for sharpening a band-saw. Saws of this kind are mounted on a machine which has a table on which the material to be sawed is placed so it may be moved into engagement with the moving band-saw which has a large number of teeth which must be sharpened at least occasionally, of course depending on the amount of use to which the saw is put.

While machines have been made for sharpening band-saws, they have been quite complicated and expensive. To sharpen such a saw by hand with a file is a slow and tedious job and not as effective as it should be, since by a hand operation the file is not always held at the proper angle to give the best results.

From our experience over quite a great many years we have finally found out a way to perform a hand operation and to get better results than any other type of operation heretofore performed, so the object of our invention is to provide means for accomplishing the main object with means that are quite simple and inexpensive to make, but which will allow a fast operation of the sharpening job. Our invention will be readily understood and appreciated by reference to the annexed drawings wherein Figure 1 on a reduced scale from a working device, shows a top plan view of our sharpening means applied to the table of a machine which is carrying the saw.

Figure 2 on a reduced scale from a working device is a side view of Figure 1 just at the beginning of a sharpening operation.

Figure 3 on a reduced scale from a working device is a view similar to Figure 2 but at the end of a filing operation or stroke.

Figure 4 is a plan view showing a part of the table of the machine carrying the saw with a tool guide plate mounted thereon.

Figure 5 is a sectional view through the means of holding a file used for sharpening the saw.

Figure 6 is a side view showing the right hand end looking at Figure 2 of the tool used for carrying the file, the file holder of Figure 5 being shown in broken lines.

Figure 7 is a view on the line 7—7 of Figure 6.

Figure 8 is a fragmentary view showing the position of the saw blade and the file for sharpening the teeth in its first approaching position to the saw blade.

Figure 9 is a view similar to Figure 8 but showing that part of the file at the end of the file stroke and with the saw moved up one tooth as indicated by the arrow.

Figure 10 is a section on the line 10—10 of Figure 5 but showing other parts of the mechanism.

Figure 11 shows the bottom view of the machine table on which the guide plate is mounted with the means for holding the guide plate in position on the table.

Figure 12 is a part sectional and part elevational view of the means of holding the guide plate illustrated in Figure 11 on the machine table.

Figure 13 is a perspective view showing how the adjusting screw support illustrated in Figure 10 can be formed directly out of the guide plate as further illustrated in Figure 4.

Referring now to drawings wherein like numbers refer to corresponding parts in the various views, 1 is the table of a machine carrying the band-saw blade 2 that is positioned in an opening O in the table of the machine.

As part of our equipment we utilize a guide plate 3 having a longitudinal extending guide rim 4. The plate 3 has a projecting finger 5 punched outwardly from the rim 4 of the plate 3.

The upper portion 6 is bent over, leaving a space between it and the main part 5 and both parts have threaded holes 6' to receive an adjusting screw 7 having an operating thumb nut 8 securely fastened thereto. On the end of screw 7 operated by the thumb nut 8, is a member 9 having a smooth even surface non-rotatably fastened to the screw 7 which carries a lock nut 10 to hold the member 9 in adjusted position against the blade of the saw 2 at a point closely adjacent to the tooth that is engaged by the file F as will be seen from Figure 3. With this arrangement a saw blade is not bent out of alignment by the application of the file thereto. The guide plate 3 has a stud 11 forced downward therefrom and threads 12 are cut on this stud to receive a lock nut 13 which may have wings 14 for quickly fastening the guide plate 3 in position on the machine table 1. In order to further properly locate the guide plate 3 a lug 15 is punched downwardly from the plate 3 and the lug 15 can be adjusted with pliers or a wrench to locate it in the slot O in the table 1.

For cooperation with the guide plate 3 we have provided a tool having a base portion 16 preferably of strong metal with its bottom surface very smooth so as to slide readily on the guide plate 3 fastened to a machine table in a satisfactory manner as described. A handle 17 preferably of suitable wood is fastened to the base 16. At the end opposite the handle 17 is a member 18' preferably integral with the base which is used as a thumb rest in the operation of the device as will be presently described. On the base 16 also is a longitudinal flange 18 and against this flange 18 is positioned a block 19 that is held to the base 16 by screws 20 and 21 which engage studs 22 and 23 integral with the base 16 and projecting upwardly therefrom. Intermediate the studs 22 and 23 is a pivot 24 which is engaged by an arcuate surface in stud 25 extending downwardly from the top part of the block 19. The block 19 has a side groove 26 which is adapted to receive one edge of a triangularly shaped file F which is held in place by a screw 27 and washer 28.

It will be seen from Figures 2, 3, 5, and 6 that the file F is not in a horizontal position looking at Figure 6, being considerably nearer the base at the starting operative end of the file. This will be clear by reference to Figures 8 and 9 wherein it will be seen that as the tool having the handle 17 is moved to the right looking at Figures 2 and 3, a file F which is at a slight angle 29 in its engagement with the saw tooth and at the end of the filing stroke, the file F will be in a position shown in Figure 9, the saw having been automatically advanced one tooth while the filing operation has been taking place.

It will be seen by adjusting screws 20 and 21 in Figure 5 that the angularity of the file with respect to a horizontal line can be quickly changed to suit the saw blade to be filed. Also it will be noticed that as a thrusting stroke is applied to the handle 17 to start the filing operation, the tool is held against the rim 4 of the guide plate 3 by pressure applied by the thumb of the operator's one hand against the thumb piece 18'.

From what has been said it will be readily understood that many of the details may be varied without departing from the spirit of our invention and the scope of the appended claims.

Having thus described our invention, what we claim is:

1. Means for sharpening the teeth of a band-saw comprising, a single flat guide plate with means for rigidly fastening it to the table of the machine carrying the saw, the guide plate having a guide rim along one longitudinal edge, a filing tool having a rigid base with a flat bottom to slide on the guide plate and an upturned edge along one side to engage said guide rim, a file holder carrying a file to fit a tooth of the saw, the holder being adjustable on the tool so when the tool is moved toward the saw the file will move the saw one tooth ahead while it is making a filing stroke on a tooth and means on the filing tool for moving it on an operating stroke.

2. Means for sharpening the teeth of a band-saw as set forth in claim 1 further defined in that said means of moving the tool includes a vertically extending hand grip at one end of the tool and an upturned thumb engaging piece at the opposite end of the tool.

3. Means for sharpening the teeth of a band-saw as set forth in claim 1 further defined in that the file holder is adjustable about a centrally located pivot so the axis of the file is nearer the base of the tool at the saw approach end than at its opposite end as and for the purpose described.

4. Means for sharpening the teeth of a band-saw as set forth in claim 1 further defined in that the file holder includes a block of rigid material fastened to the tool base by an adjusting screw at each end, the block having a longitudinal groove in its edge above the upturned edge of the tool base to receive an edge of the file, the tool base having a raised part to act as a pivot while the block has a centrally located part to fit said pivot, a screw located in the block preferably over said pivot, the screw carrying means for gripping a file positioned in said block groove.

5. Means for sharpening the teeth of a band-saw as set forth in claim 1 further defined in that said means for fastening the guide plate to said table comprises a positioning lug and a clamping stud formed out of the plate material while said guide plate rim has an upturned lug carrying an adjusting device for engaging the blade portion of the saw for the purpose described.

6. Means for sharpening the teeth of a band-saw as set forth in claim 1 further defined in that said means for fastening the guide plate to said table comprises a positioning lug and a clamping stud formed out of the plate material while said guide plate rim has an upturned lug the free end of which is bent downwardly toward the plate rim in spaced relation to the upturned part and an adjusting screw carried by said spaced parts of the lug for the purpose described.

7. Means for sharpening the teeth of a band-saw carried on a saw cutting machine having a table for receiving the material to be sawed up; said means including a single piece generally flat guide plate having a guide rim along one edge with means for fastening the plate in proper position to said table said plate also having guide means for a tool thereon and movable on the plate, a filing tool having means for carrying and moving it on said plate in engagement with said guide means on the plate, said tool also having means for mounting a suitable file thereon so when the tool is moved on said plate as described the file will engage two saw teeth and will advance the saw one tooth at a time as it does the sharpening by a filing operation due to the sliding movement of the tool on the plate.

8. Means for sharpening the teeth of a band-saw carried on a saw cutting machine having a table for receiving the material to be sawed up; as set forth in claim 7 further defined in that the guide plate has downwardly extending parts for engaging the machine table, at least one of said parts being adjustable to properly locate the plate on the table, the said plate having a longitudinal rim for guiding a tool carrying a file, said rim having an upturned lug carrying means for backing up the saw blade as the filing is being done.

9. Means for sharpening the teeth of a band-saw carried on a saw cutting machine having a table for receiving the material to be sawed up; as set forth in claim 7 further defined in that said tool has a handle for moving it along the guide plate and a thumb piece to assist in holding the tool in engagement with the guide means on said plate.

10. Means for sharpening the teeth of a band-saw carried on a saw cutting machine having a table for receiving the material to be sawed up; as set forth in claim 7 further defined in that the mounting means on the tool for holding the file comprises a block of suitable material having a longitudinal groove to receive one edge of a file, the block having tilting adjustable means to set the file at the proper angle to file a tooth on the saw while advancing the saw one tooth for each full movement of the file holding tool.

References Cited in the file of this patent

UNITED STATES PATENTS

| Number | Name | Date |
|---|---|---|
| 383,944 | Dunn | June 5, 1888 |
| 562,383 | Fisher | June 23, 1896 |
| 1,038,885 | Hestand et al. | Sept. 17, 1912 |
| 1,046,645 | Rhodes | Dec. 10, 1912 |
| 1,087,373 | Holmes | Feb. 17, 1914 |
| 1,523,820 | McDonald et al. | Jan. 20, 1925 |
| 1,610,178 | Tesch | Dec. 7, 1926 |
| 2,441,786 | Zapart | May 18, 1948 |